US011543825B2

(12) United States Patent
Zych

(10) Patent No.: US 11,543,825 B2
(45) Date of Patent: Jan. 3, 2023

(54) HUMAN SUPERVISION OF AN AUTOMATED DRIVING SYSTEM

(71) Applicant: UATC, LLC, San Francisco, CA (US)

(72) Inventor: Noah Zych, Pittsburgh, PA (US)

(73) Assignee: UATC, LLC, Mountain View, CA (US)

(*) Notice: Subject to any disclaimer, the term of this patent is extended or adjusted under 35 U.S.C. 154(b) by 188 days.

(21) Appl. No.: 17/157,288

(22) Filed: Jan. 25, 2021

(65) Prior Publication Data

US 2021/0173401 A1 Jun. 10, 2021

Related U.S. Application Data

(63) Continuation of application No. 16/202,488, filed on Nov. 28, 2018, now Pat. No. 10,915,106, which is a continuation of application No. 15/638,739, filed on Jun. 30, 2017, now Pat. No. 10,156,849.

(51) Int. Cl.
G05D 1/00 (2006.01)
G05D 1/02 (2020.01)
B60W 50/08 (2020.01)
B60R 11/04 (2006.01)
B60W 40/08 (2012.01)
G06Q 10/06 (2012.01)

(52) U.S. Cl.
CPC ......... G05D 1/0214 (2013.01); B60W 50/082 (2013.01); G05D 1/0088 (2013.01); G06Q 10/06315 (2013.01); G05D 2201/0213 (2013.01)

(58) Field of Classification Search
None
See application file for complete search history.

(56) References Cited

U.S. PATENT DOCUMENTS

| 9,547,307 | B1* | 1/2017 | Cullinane | G06Q 10/1095 |
| 9,551,992 | B1* | 1/2017 | Barton-Sweeney | G06Q 10/047 |
| 9,631,933 | B1* | 4/2017 | Aula | B60W 30/06 |
| 9,740,202 | B2* | 8/2017 | Barton-Sweeney | G05D 1/0274 |
| 9,884,631 | B2* | 2/2018 | James | B60W 50/16 |

(Continued)

OTHER PUBLICATIONS

International Preliminary Report on Patentability for PCT/US2018/038010, dated Jan. 9, 2020, 8 pages.

(Continued)

Primary Examiner — Adam D Tissot
(74) Attorney, Agent, or Firm — Dority & Manning, P.A.

(57) ABSTRACT

The present disclosure provides systems and methods that enable human supervision of a highly capable automated driving system. In particular, the systems and methods of the present disclosure enable a human (e.g., a passenger, driver/operator, or remote supervisor of an autonomous vehicle) to easily and quickly transition control of the autonomous vehicle from a primary motion plan that controls the vehicle towards a primary destination to a secondary motion plan that controls the vehicle to a safe state. As such, the systems and methods of the present disclosure enable advanced human supervision of autonomous vehicle behavior in which a human can cause an autonomous vehicle to operate in a risk-reduced manner or otherwise maneuver to a safe state, without requiring the human to actually assume manual control of the vehicle.

20 Claims, 4 Drawing Sheets

(56) References Cited

U.S. PATENT DOCUMENTS

| | | |
|---|---|---|
| 2005/0210065 A1 | 9/2005 | Nigam et al. |
| 2013/0173159 A1* | 7/2013 | Trum ................ G01C 21/3626 |
| | | 701/533 |
| 2015/0338849 A1* | 11/2015 | Nemec ................ G05D 1/0055 |
| | | 701/25 |
| 2016/0093119 A1 | 3/2016 | Ahn et al. |
| 2016/0349750 A1* | 12/2016 | Nemec ................ G05D 1/0212 |
| 2016/0355192 A1 | 12/2016 | James et al. |
| 2017/0278312 A1 | 9/2017 | Minster et al. |
| 2018/0033217 A1 | 2/2018 | Komada |
| 2018/0259966 A1 | 9/2018 | Long |
| 2018/0261020 A1 | 9/2018 | Petousis et al. |

OTHER PUBLICATIONS

International Search Report and Written Opinion for PCT/US2018/038010 dated Oct. 2, 2018, 11 pages.

Markoff, "Google's Next Phase in Driverless Cars: No Steering Wheel or Brake Pedals", The New York Times, May 27, 2014, 6 pages.

\* cited by examiner

HUMAN SUPERVISION OF AN AUTOMATED DRIVING SYSTEM

PRIORITY CLAIM

The present application is a continuation of U.S. application Ser. No. 16/202,488 having a filing date of Nov. 28, 2018, which is a continuation of U.S. application Ser. No. 15/638,739 having a filing date of Jun. 30, 2017. Applicants claim priority to and benefit of all such applications and incorporate all such applications herein by reference.

FIELD

The present disclosure relates generally to autonomous vehicles. More particularly, the present disclosure relates to systems and methods for human supervision of a highly capable automated driving system.

BACKGROUND

An autonomous vehicle is a vehicle that is capable of sensing its environment and navigating with little or no human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion path through such surrounding environment.

SUMMARY

Aspects and advantages of embodiments of the present disclosure will be set forth in part in the following description, or can be learned from the description, or can be learned through practice of the embodiments.

One example aspect of the present disclosure is directed to a computing system. The computing system includes one or more processors and one or more non-transitory computer-readable media that collectively store instructions that, when executed by the one or more processors, cause the computing system to perform operations. The operations include determining a primary motion plan that controls an autonomous vehicle towards a first destination. The operations include determining a secondary motion plan that controls the autonomous vehicle to a second destination that is different from the first destination. The operations include controlling the autonomous vehicle according to the primary motion plan. The operations include receiving a user input. The operations include, in response to receipt of the user input, switching a control of the autonomous vehicle from the primary motion plan to the secondary motion plan.

Another example aspect of the present disclosure is directed to an autonomous vehicle. The autonomous vehicle includes one or more processors and one or more non-transitory computer-readable media that collectively store instructions that, when executed by the one or more processors cause the autonomous vehicle to perform operations. The operations include determining a primary motion plan that controls the autonomous vehicle towards a first destination. The operations include determining a secondary motion plan that controls the autonomous vehicle to a second destination that is different from the first destination. The operations include controlling the autonomous vehicle according to the primary motion plan. The operations include receiving a user input. The operations include, in response to receipt of the user input, controlling the autonomous vehicle according to the secondary motion plan.

Another example aspect of the present disclosure is directed to a computer-implemented method. The method includes receiving, by a computing system comprising one or more computing devices, a user input indicative of an emergency event. The method includes, in response to receiving, by the computing system, the user input indicative of the emergency event, causing, by the computing system, transition of control of an autonomous vehicle from a primary motion plan to an emergency motion plan. The primary motion plan controls the autonomous vehicle towards a primary destination. The emergency motion plan controls the autonomous vehicle to a safe state Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
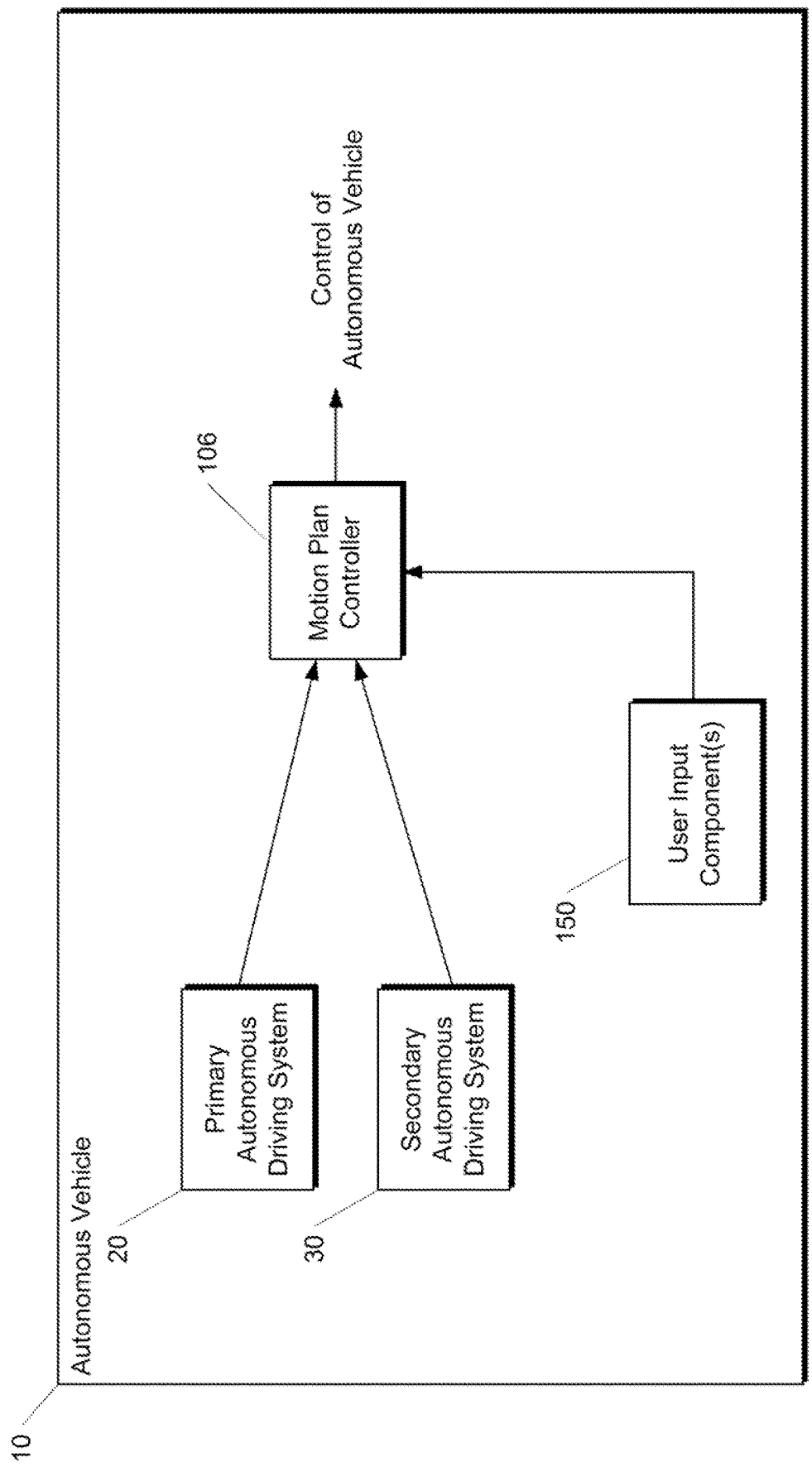
FIG. 1 depicts a block diagram of a first set of example aspects associated with an autonomous vehicle according to example embodiments of the present disclosure.

Reference numerals that are repeated across multiple Figures are intended to represent the same feature or component across multiple illustrations and/or embodiments.

DETAILED DESCRIPTION

Generally, the present disclosure is directed to systems and methods that enable human supervision of a highly capable automated driving system. In particular, the systems and methods of the present disclosure enable a human (e.g., a passenger, driver/operator, or remote supervisor of an autonomous vehicle) to easily and quickly transition control of the autonomous vehicle from a primary motion plan that controls the vehicle towards a first destination to a secondary motion plan that controls the vehicle to a second destination that is different from the first destination. In some implementations, the first destination can be a primary destination (e.g., a requested destination associated with a route), while the secondary motion plan can control the autonomous vehicle to a safe state. As such, the systems and methods of the present disclosure enable advanced human supervision of autonomous vehicle behavior in which a human can cause an autonomous vehicle to operate in a risk-reduced manner or otherwise maneuver to a safe state, without requiring the human to actually assume manual control of the vehicle. In particular, instead of a human having to recognize an undesirable situation, calculate an alternate course of action that he/she thinks is achievable, regain control of the vehicle, and provide precise steering and braking inputs to achieve the desired alternate plan, the human can recognize the undesirable situation, inform the vehicle control system of such recognition via user input, and immediately initiate the execution of a pre-calculated alternate course of action that is guaranteed to be achievable using the known precise control capabilities of the automated system. As such, the systems and methods of the present disclosure enhance both human safety and comfort.

More particularly, in some implementations, an autonomous vehicle can be a ground-based autonomous vehicle (e.g., car, truck, bus, etc.), an air-based autonomous vehicle (e.g., airplane, drone, helicopter, or other aircraft), or other types of vehicles (e.g., watercraft). The autonomous vehicle can include a computing system that assists in controlling the autonomous vehicle. In some implementations, the autonomous vehicle computing system can include a perception system, a prediction system, and a motion planning system that cooperate to perceive the surrounding environment of the autonomous vehicle and determine one or more motion plans for controlling the motion of the autonomous vehicle accordingly. The autonomous vehicle computing system can include one or more processors as well as one or more non-transitory computer-readable media that collectively store instructions that, when executed by the one or more processors, cause the autonomous vehicle computing system to perform various operations as described herein.

In particular, in some implementations, the perception system can receive sensor data from one or more sensors that are coupled to or otherwise included within the autonomous vehicle. As examples, the one or more sensors can include a Light Detection and Ranging (LIDAR) system, a Radio Detection and Ranging (RADAR) system, one or more cameras (e.g., visible spectrum cameras, infrared cameras, etc.), and/or other sensors. The sensor data can include information that describes the location of objects within the surrounding environment of the autonomous vehicle.

In addition to the sensor data, the perception system can retrieve or otherwise obtain map data that provides detailed information about the surrounding environment of the autonomous vehicle. The map data can provide information regarding: the identity and location of different roadways, road segments, buildings, or other items; the location and directions of traffic lanes (e.g., the location and direction of a parking lane, a turning lane, a bicycle lane, or other lanes within a particular roadway); traffic control data (e.g., the location and instructions of signage, traffic lights, or other traffic control devices); and/or any other map data that provides information that assists the computing system in comprehending and perceiving its surrounding environment and its relationship thereto.

The perception system can identify one or more objects that are proximate to the autonomous vehicle based on sensor data received from the one or more sensors and/or the map data. In particular, in some implementations, the perception system can provide, for each object, state data that describes a current state of such object. As examples, the state data for each object can describe an estimate of the object's: current location (also referred to as position); current speed (also referred to as velocity); current acceleration; current heading; current orientation; size/footprint (e.g., as represented by a bounding polygon); class (e.g., vehicle vs. pedestrian vs. bicycle), and/or other state information.

The prediction system can receive the state data and can predict one or more future locations for the object(s) identified by the perception system. For example, various prediction techniques can be used to predict the one or more future locations for the object(s) identified by the perception system. The prediction system can provide the predicted future locations of the objects to the motion planning system.

The motion planning system can determine one or more motion plans for the autonomous vehicle based at least in part on the state data provided by the perception system and/or the predicted one or more future locations for the objects. Stated differently, given information about the current locations of proximate objects and/or predictions about the future locations of proximate objects, the motion planning system can determine motion plan(s) for the autonomous vehicle that best navigate the vehicle relative to the objects at their current and/or future locations.

As an example, in some implementations, the motion planning system operates to generate new autonomous motion plan(s) for the autonomous vehicle multiple times per second. Each new autonomous motion plan can describe motion of the autonomous vehicle over the next several seconds (e.g., 5 seconds). Thus, in some example implementations, the motion planning system continuously operates to revise or otherwise generate a short-term motion plan based on the currently available data.

In particular, according to an aspect of the present disclosure, a system that controls motion of an autonomous vehicle (e.g., the motion planning system described above) can determine (e.g., continuously or near-continuously determine) both a primary motion plan that controls towards a first destination (e.g., a primary destination) and also a secondary motion plan that controls the vehicle to a second destination (e.g., a safe state). For example, in some implementations, the secondary motion plan can include maneuvering the vehicle into a minimum risk condition and/or according to a minimum risk trajectory. As examples, the secondary motion plan can include bringing the autonomous vehicle to a rest/stop (e.g., within a current lane) and/or maneuvering (e.g., according to a shortest possible trajectory) the vehicle to reach a location outside a flow of traffic (e.g., a shoulder or a center divider of the road). Thus, at all times, the autonomous vehicle can have both a primary motion plan that corresponds to typical operation of the vehicle and a secondary motion plan that corresponds to operation of the vehicle in a risk-reducing manner.

As used herein, a "safe state" generally corresponds to a location and/or state (e.g., speed, heading, etc.) of an autonomous vehicle that is relatively safer (e.g., significantly safer) than continued travel of the autonomous vehicle along a travelway (e.g., roadway). That is, by transitioning the autonomous vehicle from travel along the travelway to the safe state, the risk of collision and/or other unsafe outcomes is reduced. Generally, transitioning the vehicle to the safe state can include reducing the speed of the vehicle, bringing the vehicle to a stop, causing the vehicle to exit a travelway, causing the vehicle to exit a flow of traffic, or other actions. As one example, controlling the vehicle to a safe state can include causing the vehicle to pull off to and stop upon a shoulder of the travelway.

In some implementations, the autonomous vehicle can include a single autonomous driving system that generates both the primary motion plan and the secondary motion plan. As one example, in some implementations, the single autonomous driving system can include a single motion planning system as described above. The motion planning system can include an optimization planner or other iterative solver or regulator that optimizes over a first set of cost functions to generate the primary motion plan and also optimizes over a second set of cost functions to generate the secondary motion plan. Thus, different sets of cost functions can be tuned to provide different motion plans that meet different objectives.

In other implementations, the autonomous vehicle can include a single autonomous driving system that, during normal operation, generates only the primary motion plan. In such implementations, in response to receipt of a user input, the autonomous driving system can instantly switch and generate and execute the secondary motion plan (e.g., emergency motion plan) to control the autonomous vehicle to the safe state. Thus in some implementations, the secondary motion plan is constantly being generated, while in other implementations, the secondary motion plan is generated only in response to receipt of user input.

In yet other implementations, the autonomous vehicle can include multiple autonomous driving systems or portions thereof. In some implementations, the multiple different autonomous driving systems can share some resources or components (e.g., can each receive the same sensor data, state data, and/or predictions) while having some separate components (e.g., separate motion planning systems). In other implementations, the multiple different autonomous driving systems can be wholly distinct and separate. For example, each respective autonomous driving system can receive or otherwise obtain its own separate sensor data and make its own determinations regarding world state and motion planning. Thus, in one example, an autonomous vehicle can include a primary motion planning system that determines the primary motion plan and a secondary motion planning system that determines the secondary motion plan, where at least the secondary motion planning system is separate and distinct from the primary motion planning system. Providing multiple redundant motion planning systems ensures that the secondary motion plan will be available even in the event that the primary motion planning system faults, fails, or otherwise malfunctions.

According to another aspect of the present disclosure, a human (e.g., a passenger, "driver"/operator, or remote supervisor of the autonomous vehicle) can be provided with the ability to enter user input. For example, the user input can be indicative of an undesirable condition. As examples, the undesirable condition can include an emergency event; a vehicle failure event (e.g., the primary motion plan is incorrect or null, the vehicle is failing to execute the primary motion plan or otherwise malfunctioning, etc.); or other types of conditions, situations or events in which the human feels uncomfortable and/or wishes for the vehicle to maneuver to a safe state. When the user input is indicative of an emergency event, a secondary motion plan can correspond to an emergency motion plan. The user input can initiate transition of control of an autonomous vehicle from a primary motion plan to the emergency motion plan.

In particular, in some implementations, the autonomous vehicle can include one or more input components (e.g., button(s), display(s), etc.) that enable a human to provide a user input (e.g., by pressing the button(s)). As examples, the input components can include one or more buttons, levers, knobs, handheld triggers, pedals, or the like. For example, the input component can include a button that is located on a steering wheel of the autonomous vehicle. As another example, the user input can be received via user interaction with a graphical user interface that is displayed on a display device (e.g., a front or rear seat display device). Thus, the human can press a button or other interface feature on the graphical user interface to provide the user input.

According to another aspect of the present disclosure, in response to receipt of the user input, control of the autonomous vehicle can be transitioned from the primary motion plan to the secondary motion plan. For example, a motion plan controller or other device can receive a signal indicative of the user input and, in response, switch control of the autonomous vehicle from the primary motion plan to the secondary motion plan. Switching to the secondary motion plan can result in automatically controlling the autonomous vehicle to the safe state.

Thus, within an automated system that always has two (or more) potential courses of action prepared, human supervisor input can direct the vehicle to switch from its primary course of action to a secondary course of action. In particular, the secondary course of action can be calculated to maximize safety or otherwise reduce risk.

In some implementations, one or more autonomous vehicle driving systems can generate multiple different secondary motion plans. As examples, a first secondary motion plan might include exiting traffic flow to the left-hand side or center divider of the road, a second secondary motion plan might include bringing the autonomous vehicle to rest or stopping in the current lane, and a third secondary motion plan might include exiting traffic flow to the right-hand side of the road. As another example, different secondary motion plans might include an abrupt stop versus a graceful stop. In some implementations, in response to the user input indicative of the undesirable condition, a motion plan controller or other device can select a particular one of the multiple different secondary motion plans for execution. For example, such selection can be made on the basis of respective scores (e.g., safety scores) assigned to each secondary motion plan (e.g., the safest secondary motion plan can be selected). In some implementations, scores for the multiple different secondary motion plans can be pre-determined. In some implementations, scores for the different secondary motion plans can be dynamically calculated based on the most recent state data and/or predicted future locations for the objects proximate to the autonomous vehicle. In some implementations, the user input provided by the human can select a particular one of the multiple different secondary motion plans for execution. For example, multiple buttons, controls, or other user input components can be provided which enable the human to select a particular one of the multiple different secondary motion plans for execution.

After the autonomous vehicle executes the secondary motion plan, the autonomous vehicle and/or related systems can perform a number of additional operations or actions. As one example, after completion of the secondary motion plan, the autonomous vehicle can return or default to a manual control mode in which the human is able to control motion of the vehicle. In some implementations, the autonomous vehicle changes to the manual control mode only after a time-out period (e.g., thirty seconds) has lapsed. As another example, after completion of the secondary motion plan, the autonomous vehicle can transmit an alert to a centralized fleet manager computing system. The alert can indicate that an incident occurred, which can prompt a fleet manager to further investigate or take other action(s).

The systems and methods of the present disclosure provide a number of technical effects and benefits. For example, the systems and methods of the present disclosure improve autonomous vehicle passenger safety by continuously calculating a secondary motion plan that enables the vehicle to maneuver to a safe state in the event of an undesirable condition. In particular, in the event of failure or malfunction of the primary motion plan, rather than require the human to actively gain control of the vehicle and manually maneuver the vehicle, the human simply provides a user input which automatically transitions the autonomous vehicle to the secondary motion plan. In particular, instead of a human having to recognize an undesirable situation, calculate an alternate course of action that he/she thinks is achievable, regain control of the vehicle, and provide precise steering and braking inputs to achieve the desired alternate plan, the human can recognize the undesirable situation, inform the vehicle control system of such recognition via user input, and immediately initiate the execution of a pre-calculated alternate course of action that is guaranteed to be achievable using the known precise control capabilities of the automated system. As such, the systems and methods of the present disclosure enhance both human safety and comfort as well as safety of the autonomous vehicle.

Furthermore, by providing easily accessible and reliable human access to the secondary motion plan (e.g., to perform emergency response control), the requirement for a human to constantly be capable of correcting the vehicle's motion can be eliminated. As one technical benefit, elimination of the need for manual control of the vehicle can eliminate the need for the vehicle to include manual control components such as pedals, steering wheels, etc. Eliminating such components from the vehicle can reduce vehicle cost and increase the amount of space within the vehicle that can be dedicated to passenger comfort and/or utility. Likewise, elimination of the need for manual control of the vehicle can enable manual control components such as pedals, steering wheels, etc. to be removed from an existing vehicle, or inputs on those manual control components disregarded when the system described by the present disclosure is active.

As another technical benefit that derives from eliminating the need for manual control or correction of the vehicle's motion plan, the operation of the autonomous vehicle according to the primary motion plan can operate within a broader control space that exceeds, in at least some instances, the ability to manually correct the vehicle's motion. In particular, in some instances in which manual correctability of the vehicle's motion is required, the primary motion plan can be constrained to operate within a limited planning or control space that ensures that the motion of the vehicle is manually correctable at all times. For example, the primary motion planning space can be constrained to prevent torque on the steering wheel that is not reversible or otherwise correctable by a human. However, in instances in which the need for manual control or correction of the vehicle's motion plan is eliminated, such limits or constraints on the primary motion planning space can be removed or reduced, thereby enabling the primary motion planning to have improved and more broadly capable performance.

While the systems and methods described herein are highly applicable to a fully autonomous vehicle, they are also applicable to a lower level of driving automation/driver assistance system such as, for example, an SAE level 3 system, which will sometimes request a driver to intervene. In this case, the systems and methods described herein could allow the driver to indicate a preference to execute a secondary plan instead of prompting the driver to exclusively assume manual steering and braking control, which he/she may not be prepared to do.

With reference now to the Figures, example embodiments of the present disclosure will be discussed in further detail.

Example Devices and Systems

FIG. 1 depicts a block diagram of a first set of example aspects associated with an autonomous vehicle 10 according to example embodiments of the present disclosure. In particular, according to an aspect of the present disclosure, the autonomous vehicle 10 can include a primary autonomous driving system 20 and a secondary autonomous driving system 30.

The primary autonomous driving system 20 can determine (e.g., continuously or near-continuously determine) a primary motion plan that controls the autonomous vehicle 10 towards a primary destination. The primary motion plan can include a primary trajectory. The primary autonomous driving system 20 can provide the primary motion plan to a motion plan controller 106 of the autonomous vehicle 10.

In some implementations, primary motion plan can be calculated to form a segment of a planned route, with the primary motion plan providing real-time adjustments that are responsive to conditions and events which are encountered or planned as the vehicle progresses along a planned route. In some implementations, the primary motion plan can be calculated continuously for a distance that covers, for example, a distance which the vehicles expected to traverse over a threshold duration of time (e.g., 5 seconds).

The secondary autonomous driving system 30 can determine (e.g., continuously or near-continuously determine) a secondary motion plan that controls the autonomous vehicle 10 to a safe state. The secondary motion plan can include a secondary trajectory. The secondary autonomous driving system 30 can provide the secondary motion plan to the motion plan controller 106 of the autonomous vehicle 10.

In some implementations, the secondary motion plan can include maneuvering the autonomous vehicle 10 into a minimum risk condition and/or according to a minimum risk trajectory. As examples, the secondary motion plan can include bringing the autonomous vehicle 10 to a rest/stop (e.g., within a current lane) and/or maneuvering (e.g., according to a shortest possible trajectory) the autonomous vehicle 10 to reach a location outside a flow of traffic (e.g., a shoulder or a center divider of the road). Thus, in some implementations, a secondary motion plan can be calculated, for example, as a shortest path needed to bring the autonomous vehicle 10 to a location outside of the flow of traffic where the autonomous vehicle 10 can be stopped or slowed down.

In some implementations, the secondary motion plan can be a failsafe action in which the vehicle drives to safety and stops (or shuts-off). In some implementations, the secondary motion plan can be implemented independent of higher processing logic and resources based on an assumption that the higher-level processors or logic have stopped working or are not reliable.

In some implementations, the secondary autonomous driving system 30 can calculate one or more secondary motion plans by selecting a stopping location for a vehicle, and then determining a path to enable the vehicle to reach the selected stopping location. The secondary autonomous driving system 30 can select multiple stopping locations which are within, for example, a threshold distance or travel time from the autonomous vehicle 10 at a particular instant. The secondary autonomous driving system 30 can select a stopping location based on, for example, a characteristic or attribute (e.g., shoulder width). Thus, the selected stopping location can be different than, for example, the closest stopping location, but the selected stopping location can have a characteristic or attribute which makes the selected stopping location more optimal for safety than the closest stopping location.

For example, the secondary autonomous driving system 30 can calculate at least one secondary motion plan which identifies a safe (or most safe) route to move the vehicle to a selected length of the shoulder on the road, based on a determination that the shoulder of the selected length is widened, or based on another determination that an emergency telephone is located at or near the particular location. In some implementations, the secondary autonomous driving system 30 can select a road shoulder (e.g., left or right shoulder) as a destination of the secondary motion plan, based on factors such as proximity and shoulder size.

Thus, at all times, the motion plan controller 106 of the autonomous vehicle 10 can have both a primary motion plan that corresponds to typical operation of the autonomous vehicle 10 and a secondary motion plan that corresponds to operation of the autonomous vehicle 10 in a risk-reducing manner.

Typically, during routine operation, the motion plan controller 106 will control the autonomous vehicle 10 according to the primary motion plan, thereby progressing the autonomous vehicle 10 towards the primary destination. However, in some instances, the motion plan controller 106 can transition or otherwise switch control of the autonomous vehicle 10 to the secondary motion plan.

In some implementations, the motion plan controller 106 can convert the primary motion plan and/or the secondary motion plan to control parameters for individual interfaces or components of the autonomous vehicle 10. For example, these interfaces or components can include a propulsion interface (e.g., gas pedal), a steering interface, a breaking interface, and/or a lighting/auxiliary interface.

In some implementations, motion plan controller 106 can include lower-level logic to implement both the primary motion plan and the secondary motion plan. In a variation, a redundant or alternative controller can receive the secondary motion plan on an ongoing basis, and then implement the secondary motion plan when the user input is received. In either scenario, the motion plan controller(s) 106 can include memory to store and update the motion plans as well as a trigger to activate transition or switching to the secondary motion plan when user input is received.

In some implementations, the primary autonomous driving system 20 and the secondary autonomous driving system 30 can be a single autonomous driving system that generates both the primary motion plan and the secondary motion plan. As one example, in some implementations, the single autonomous driving system can include a single motion planning system. The motion planning system can include an optimization planner or other iterative solver or regulator that optimizes over a first set of cost functions to generate the primary motion plan and also optimizes over a second set of cost functions to generate the secondary motion plan. Thus, different sets of cost functions can be tuned to provide different motion plans that meet different objectives.

In other implementations, the primary autonomous driving system 20 and the secondary autonomous driving system 30 can at least in part be independent, separate, distinct, and/or redundant relative to each other. In some implementations, the primary autonomous driving system 20 and the secondary autonomous driving system 30 can share some resources or components (e.g., can each receive the same sensor data, state data, and/or predictions) while having some separate components (e.g., separate motion planning systems). In other implementations, the primary autonomous driving system 20 and the secondary autonomous driving system 30 can be wholly distinct and separate relative to each other. For example, each respective one of the primary autonomous driving system 20 and the secondary autonomous driving system 30 can receive or otherwise obtain its own separate sensor data and make its own determinations regarding world state and motion planning.

Providing multiple redundant motion planning systems ensures that the secondary motion plan will be available even in the event that the primary motion planning system faults, fails, or otherwise malfunctions.

In some implementations, the primary autonomous driving system 20 can include a higher level of programming and logic, such as used to implement models for route planning and event determination in response; while the secondary autonomous driving system 30 includes lower-level functionality, implemented through, for example, hardware and/or firmware, to carry out specific tasks or operations.

According to another aspect of the present disclosure, the autonomous vehicle 10 can include one or more user input components 150 that enable a human (e.g., a passenger, "driver"/operator, or remote supervisor of the autonomous vehicle) to enter user input. For example, the user input can be indicative of an undesirable condition such as: an emergency event; a vehicle failure event (e.g., the primary motion plan is incorrect or null, the vehicle is failing to execute the primary motion plan or otherwise malfunctioning, etc.); or other types of conditions, situations or events in which the human feels uncomfortable and/or wishes for the vehicle to maneuver to a safe state. When the user input is indicative of an emergency event, a secondary motion plan can correspond to an emergency motion plan. The user input can initiate transition of control of an autonomous vehicle from a primary motion plan to the emergency motion plan.

As examples, the input components 150 can include one or more buttons, levers, knobs, handheld triggers, pedals, or the like. For example, the input component 150 can include a button that is located on a steering wheel of the autonomous vehicle 10. As another example, the user input component 150 can include a display device (e.g., a front or rear seat display device) via which user input can be received via user interaction with a graphical user interface that is displayed on the display device. Thus, the human can press a button or other interface feature on the graphical user interface to provide the user input.

In some implementations, the input components 150 can be audio-based. For example, a microphone can receive user input via a voice command or other audio signal. As yet another example, the input components 150 can be vision-based. For example, user input can be obtained through analysis of imagery captured by a camera. For example, computer vision techniques can be applied to imagery to assess or identify gestures, speech, eye movement, and/or facial expressions indicative of user input.

In some implementations, the user input can be provided by a remote supervisor that is remote relative to the autonomous vehicle 10. In such instance, one or more user input components can be located remotely from the vehicle 10. In such instance, the one or more user input components 150 that are located on the autonomous vehicle 10 can include communications components (e.g., wireless communications components such as transmitters, receivers, etc.) that enable receipt of the remotely-provided user input (e.g., over a network such as, for example, cellular data network).

According to another aspect of the present disclosure, in response to receipt of the user input, the motion plan controller 106 can transition or otherwise switch control of the autonomous vehicle 10 from the primary motion plan to the secondary motion plan. For example, the motion plan controller 106 can receive a signal indicative of the user input from the user input components 150 and, in response, switch control of the autonomous vehicle 10 from the primary motion plan to the secondary motion plan. Switching to the secondary motion plan can result in automatically controlling the autonomous vehicle to the safe state.

Thus, within an automated system that always has two (or more) potential courses of action prepared, human supervisor input can direct the vehicle to switch from its primary course of action to a secondary course of action. In particular, the secondary course of action can be calculated to maximize safety or otherwise reduce risk.

In some implementations, the secondary autonomous driving system 30 and/or additional autonomous driving systems can generate multiple different secondary motion plans. As examples, a first secondary motion plan might include exiting traffic flow to the left-hand side or center divider of the road, a second secondary motion plan might include bringing the autonomous vehicle to rest or stopping in the current lane, and a third secondary motion plan might include exiting traffic flow to the right-hand side of the road. As another example, different secondary motion plans might include an abrupt stop versus a graceful stop.

In some implementations, the multiple secondary motion plans can each provide an assurance that the vehicle can reach safety (e.g., a location for a safe stop). In some implementations, the multiple secondary motion plans are each designed to provide at least a threshold or maximum level of assurance that the autonomous vehicle 10 will be able to reach a safe location to stop. In some implementations, the number of calculated secondary motion plans can be varied.

In some implementations, in response to the user input, the motion plan controller 106 can select a particular one of the multiple different secondary motion plans for execution. For example, such selection can be made on the basis of respective scores (e.g., safety scores) assigned to each secondary motion plan (e.g., the safest secondary motion plan can be selected). In some implementations, scores for the multiple different secondary motion plans can be predetermined. In some implementations, scores for the different secondary motion plans can be dynamically calculated based on the most recent state data and/or predicted future locations for the objects proximate to the autonomous vehicle 10.

In some implementations, the user input provided by the human can select a particular one of the multiple different secondary motion plans for execution. For example, multiple buttons, controls, or other user input components 150 can be provided which enable the human to select a particular one of the multiple different secondary motion plans for execution.

Figure 2:
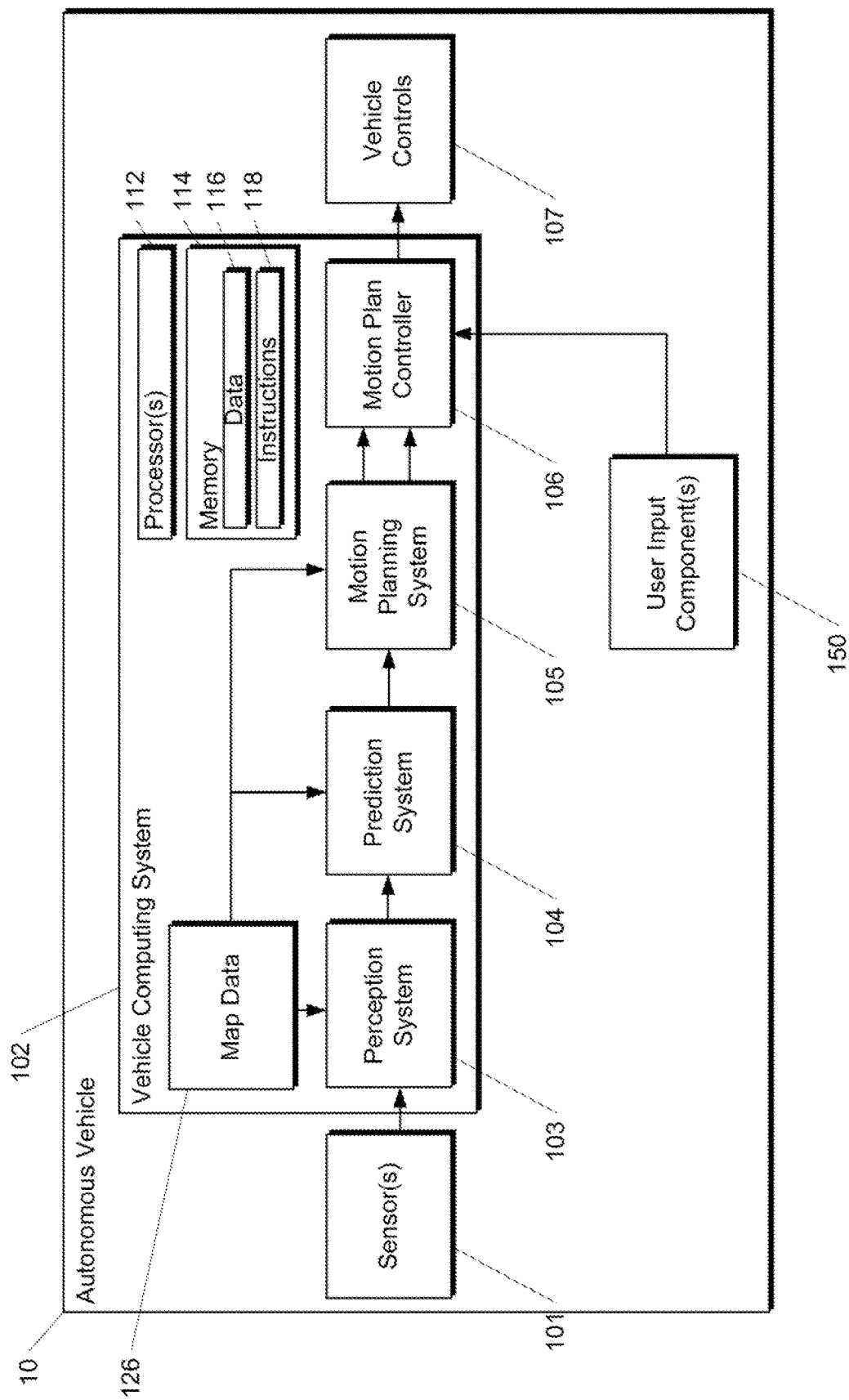
FIG. 2 depicts a block diagram of a second set of example aspects associated with an autonomous vehicle according to example embodiments of the present disclosure.

FIG. 2 depicts a block diagram of an example autonomous vehicle 10 according to example embodiments of the present disclosure. The autonomous vehicle 10 is capable of sensing its environment and navigating without human input. The autonomous vehicle 10 can be a ground-based autonomous vehicle (e.g., car, truck, bus, etc.), an air-based autonomous vehicle (e.g., airplane, drone, helicopter, or other aircraft), or other types of vehicles (e.g., watercraft).

The autonomous vehicle 10 includes one or more sensors 101, a vehicle computing system 102, and one or more vehicle controls 107. The vehicle computing system 102 can assist in controlling the autonomous vehicle 10. In particular, the vehicle computing system 102 can receive sensor data from the one or more sensors 101, attempt to comprehend the surrounding environment by performing various processing techniques on data collected by the sensors 101, and generate an appropriate motion plan through such surrounding environment. The vehicle computing system 102 can control the one or more vehicle controls 107 to operate the autonomous vehicle 10 according to the motion plan.

The vehicle computing system 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause vehicle computing system 102 to perform operations.

As illustrated in FIG. 2, the vehicle computing system 102 can include a perception system 103, a prediction system 104, and a motion planning system 105 that cooperate to perceive the surrounding environment of the autonomous vehicle 10 and determine a motion plan for controlling the motion of the autonomous vehicle 10 accordingly.

In particular, in some implementations, the perception system 103 can receive sensor data from the one or more sensors 101 that are coupled to or otherwise included within the autonomous vehicle 10. As examples, the one or more sensors 101 can include a Light Detection and Ranging (LIDAR) system, a Radio Detection and Ranging (RADAR) system, one or more cameras (e.g., visible spectrum cameras, infrared cameras, etc.), and/or other sensors. The sensor data can include information that describes the location of objects within the surrounding environment of the autonomous vehicle 10.

As one example, for a LIDAR system, the sensor data can include the location (e.g., in three-dimensional space relative to the LIDAR system) of a number of points that correspond to objects that have reflected a ranging laser. For example, a LIDAR system can measure distances by measuring the Time of Flight (TOF) that it takes a short laser pulse to travel from the sensor to an object and back, calculating the distance from the known speed of light.

As another example, for a RADAR system, the sensor data can include the location (e.g., in three-dimensional space relative to the RADAR system) of a number of points that correspond to objects that have reflected a ranging radio wave. For example, radio waves (e.g., pulsed or continuous) transmitted by the RADAR system can reflect off an object and return to a receiver of the RADAR system, giving information about the object's location and speed. Thus, a RADAR system can provide useful information about the current speed of an object.

As yet another example, for one or more cameras, various processing techniques (e.g., range imaging techniques such as, for example, structure from motion, structured light, stereo triangulation, and/or other techniques) can be performed to identify the location (e.g., in three-dimensional space relative to the one or more cameras) of a number of points that correspond to objects that are depicted in imagery captured by the one or more cameras. Other sensor systems can identify the location of points that correspond to objects as well.

As another example, the one or more sensors 101 can include a positioning system. The positioning system can determine a current position of the vehicle 10. The positioning system can be any device or circuitry for analyzing the position of the vehicle 10. For example, the positioning system can determine position by using one or more of inertial sensors, a satellite positioning system, based on IP address, by using triangulation and/or proximity to network access points or other network components (e.g., cellular towers, WiFi access points, etc.) and/or other suitable techniques. The position of the vehicle 10 can be used by various systems of the vehicle computing system 102.

Thus, the one or more sensors 101 can be used to collect sensor data that includes information that describes the location (e.g., in three-dimensional space relative to the autonomous vehicle 10) of points that correspond to objects within the surrounding environment of the autonomous vehicle 10.

In addition to the sensor data, the perception system 103 can retrieve or otherwise obtain map data 126 that provides detailed information about the surrounding environment of the autonomous vehicle 10. The map data 126 can provide information regarding: the identity and location of different travelways (e.g., roadways), road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travelway); traffic control data (e.g., the location and instructions of signage, traffic lights, or other traffic control devices); and/or any other map data that provides information that assists the computing system 102 in comprehending and perceiving its surrounding environment and its relationship thereto.

The perception system 103 can identify one or more objects that are proximate to the autonomous vehicle 10 based on sensor data received from the one or more sensors 101 and/or the map data 126. In particular, in some implementations, the perception system 103 can determine, for each object, state data that describes a current state of such object. As examples, the state data for each object can describe an estimate of the object's: current location (also referred to as position); current speed (also referred to as velocity); current acceleration; current heading; current orientation; size/footprint (e.g., as represented by a bounding shape such as a bounding polygon or polyhedron); class (e.g., vehicle versus pedestrian versus bicycle versus other); yaw rate; and/or other state information.

In some implementations, the perception system 103 can determine state data for each object over a number of iterations. In particular, the perception system 103 can update the state data for each object at each iteration. Thus, the perception system 103 can detect and track objects (e.g., vehicles) that are proximate to the autonomous vehicle 10 over time.

The prediction system 104 can receive the state data from the perception system 103 and predict one or more future locations for each object based on such state data. For example, the prediction system 104 can predict where each object will be located within the next 5 seconds, 10 seconds, 20 seconds, etc. As one example, an object can be predicted to adhere to its current trajectory according to its current speed. As another example, other, more sophisticated prediction techniques or modeling can be used.

The motion planning system 105 can determine one or more motion plans for the autonomous vehicle 10 based at least in part on the predicted one or more future locations for the object and/or the state data for the object provided by the perception system 103. Stated differently, given information about the current locations of objects and/or predicted future locations of proximate objects, the motion planning system 105 can determine one or more motion plans for the autonomous vehicle 10 that best navigate the autonomous vehicle 10 relative to the objects at such locations.

In particular, according to an aspect of the present disclosure, the motion planning system 105 can evaluate one or more cost functions for each of one or more candidate motion plans for the autonomous vehicle 10. For example, the cost function(s) can describe a cost (e.g., over time) of adhering to a particular candidate motion plan and/or describe a reward for adhering to the particular candidate motion plan. For example, the reward can be of opposite sign to the cost.

More particularly, to evaluate the one or more cost functions, the motion planning system 105 can determine a plurality of features that are within a feature space. For example, the status of each feature can be derived from the state of the vehicle and/or the respective states of other objects or aspects of the surrounding environment. The motion planning system 105 can determine the plurality of features for each vehicle state included in the current candidate motion plan.

The motion planning system 105 can evaluate one or more cost functions based on the determined features. For example, in some implementations, the one or more cost functions can include a respective linear cost for each feature at each state.

The motion planning system 105 can iteratively optimize the one or more cost functions to minimize a total cost associated with the candidate motion plan. For example, the motion planning system 105 can include an optimization planner that iteratively optimizes the one or more cost functions.

Following optimization, the motion planning system 105 can provide the optimal motion plan to a motion plan controller 106 that controls one or more vehicle controls 107 (e.g., actuators or other devices that control gas flow, steering, braking, etc.) to execute the optimal motion plan.

Each of the perception system 103, the prediction system 104, the motion planning system 105, and the motion plan controller 106 can include computer logic utilized to provide desired functionality. In some implementations, each of the perception system 103, the prediction system 104, the motion planning system 105, and the motion plan controller 106 can be implemented in hardware, firmware, and/or software controlling a general purpose processor. For example, in some implementations, each of the perception system 103, the prediction system 104, the motion planning system 105, and the motion plan controller 106 includes program files stored on a storage device, loaded into a memory and executed by one or more processors. In other implementations, each of the perception system 103, the prediction system 104, the motion planning system 105, and the motion plan controller 106 includes one or more sets of computer-executable instructions that are stored in a tangible computer-readable storage medium such as RAM hard disk or optical or magnetic media.

Although FIG. 2 illustrates only one block for each of the sensors 101, perception system 103, prediction system 104, and motion planning system 105, in some implementations, the autonomous vehicle 10 can include a duplicate or additional one of one or more of the above listed systems or components. For example, in some implementations, the autonomous vehicle 10 can include an additional motion planning system that generates the secondary motion plan. In yet further implementations, the autonomous vehicle 10 can include an additional perception system, an additional prediction system, and an additional motion planning system that operates to generate the secondary motion plan. Thus, in some implementations, the system 102 as specifically illustrated in FIG. 2 can generate both the primary motion plan and the secondary motion plan. However, in other implementations, one or more of the systems and/or components illustrated in FIG. 2 can be duplicated or otherwise redundantly provided to generate the secondary motion plan in a separate and distinct fashion.

Figure 3:
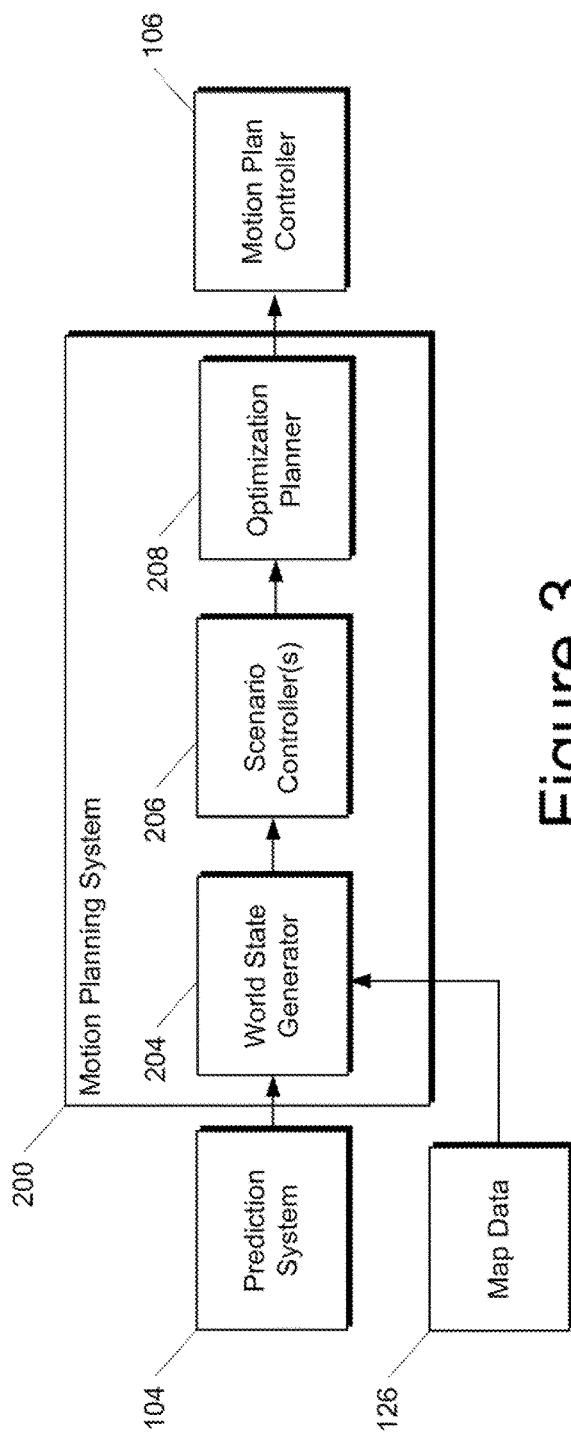
FIG. 3 depicts a block diagram of an example autonomous vehicle motion planning system according to example embodiments of the present disclosure.

FIG. 3 depicts a block diagram of an example motion planning system 200 according to example embodiments of the present disclosure. The example motion planning system 200 includes a world state generator 204, one or more scenario controllers 206, and an optimization planner 208.

The world state generator 204 can receive information from the prediction system 104, the map data 126, and/or other information such as vehicle pose, a current route, or other information. The world state generator 204 can synthesize all received information to produce a world state that describes the state of all objects in and other aspects of the surrounding environment of the autonomous vehicle at each time step.

The scenario controller(s) 206 can detect certain scenarios (e.g., a changing lanes scenario versus a queueing scenario) and guide the behavior of the autonomous vehicle according to the selected scenario. Thus, the scenario controller(s) can make discrete-type decisions (e.g., should the autonomous vehicle turn left, turn right, change lanes, etc.) and can control motion of the vehicle based on such decisions. In some implementations, each of the scenario controller(s) 206 can be a classifier (e.g., a machine-learned classifier) designed to classify the current state of the world as either included or excluded from one or more corresponding scenarios. In some implementations, the scenario controller(s) 206 can operate at each time step.

As examples, the scenario controllers 206 can include one or more of: a pass, ignore, queue controller that decides, for each object in the world, whether the autonomous vehicle should pass, ignore, or queue such object; a yield controller that decides, for each adjacent vehicle in the world, whether the autonomous vehicle should yield to such vehicle; a lane change controller that identifies whether and when to change lanes; and/or a speed regressor that determines an appropriate driving speed for each time step. These scenario controllers 206 are provided as examples only. Alternative and/or additional scenario controllers 206 can be used. In some implementations of the present disclosure, the motion planning system 200 does not include or implement the scenario controllers 206.

According to another aspect of the present disclosure, the motion planning system 200 can include an optimization planner 208 that searches (e.g., iteratively searches) over a motion planning space (e.g., an available control space) to identify a motion plan that optimizes (e.g., locally optimizes) a total cost associated with the motion plan. For example, the optimization planner can iteratively evaluate and modify a candidate motion plan until the total cost is optimized.

Figure 4:
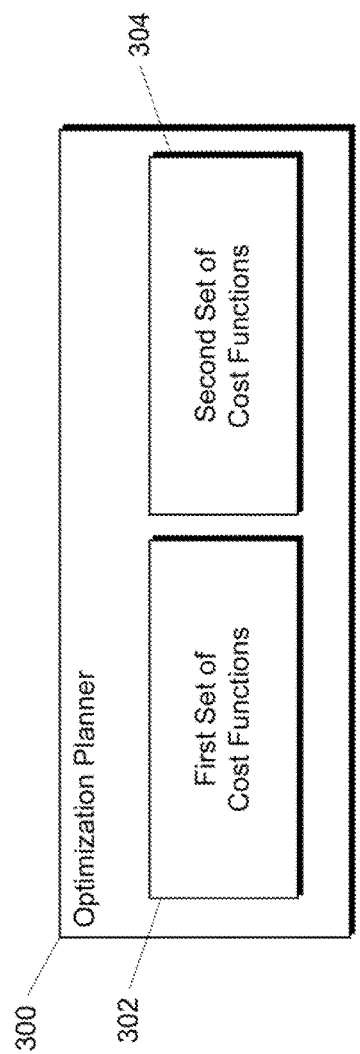
FIG. 4 depicts a block diagram of an example autonomous vehicle optimization planner according to example embodiments of the present disclosure.

FIG. 4 depicts a block diagram of an example optimization planner 300 according to example embodiments of the present disclosure. The optimization planner 300 can iteratively search over a motion planning space (e.g., an available control space) to identify a motion plan that optimizes (e.g., locally optimizes) a total cost associated with the motion plan. In particular, the example optimization planner 300 can implement an optimizer to optimize the total cost. The optimizer can be or include a solver (e.g., an iterative solver) or other optimization tool that is able to optimize the total cost. In some implementations, the optimizer is an iterative linear quadratic regulator. In one example implementation, the total cost equals the sum of all costs minus the sum of all rewards and the optimization planner attempts to minimize the total cost.

To provide an example cost function for the purpose of illustration: a first example cost function can provide a first cost that is negatively correlated to a magnitude of a first distance from the autonomous vehicle to a lane boundary. Thus, if a candidate motion plan approaches a lane boundary, the first cost increases, thereby discouraging (e.g., through increased cost penalization) the autonomous vehicle from selecting motion plans that come close to or cross over lane boundaries. This first example cost function is provided only as an example cost function to illustrate the principle of cost. The first cost function is not required to implement the present disclosure. Many other and different cost functions 304 can be employed in addition or alternatively to the first cost function described above.

Furthermore, in some implementations, the cost function(s) can include a portion that provides a reward rather than a cost. For example, the reward can be of opposite sign to cost(s) provided by other portion(s) of the cost function. Example rewards can be provided for distance traveled, velocity, or other forms of progressing towards completion of a route.

According to an aspect of the present disclosure, in some implementations, the optimization planner 300 can optimize over both a first set of cost functions 302 to generate the primary motion plan. The optimization planner 300 can also separately optimize a second set of cost functions 304 to generate the secondary motion plan. Thus, different sets of cost functions 302 and 304 can be separately optimized to provide different motion plans that meet different objectives. Thus, in at least some implementations, a single motion planning system can implement the optimization planner 300 to optimize over both the first set of cost functions 302 and the second set of cost functions 304 to generate the primary motion plan and the secondary motion plan.

However, in other implementations, multiple motion planning systems and/or multiple optimization planners can be provided to generate the primary motion plan and the secondary motion plan. For example, a first optimization planner can optimize the first set of cost functions 302 to generate the primary motion plan while a second, separate optimization planner optimizes the second set of cost functions 304 to generate the secondary motion plan. In yet further implementations, the secondary motion plan is not generated through use of an optimization planner and/or cost functions.

Referring again to FIG. 3, once the optimization planner 208 has identified the optimal candidate motion plan(s) (or some other iterative break occurs), the optimal candidate motion plan(s) can be selected and executed by the autonomous vehicle. For example, the motion planning system 200 can provide the selected motion plan to a motion plan controller 106 that controls one or more vehicle controls (e.g., actuators that control gas flow, steering, braking, etc.) to execute the selected motion plan.

Each of the world state generator 204, scenario controller(s) 206, and the optimization planner 208 can include computer logic utilized to provide desired functionality. In some implementations, each of world state generator 204, scenario controller(s) 206, and the optimization planner 208 can be implemented in hardware, firmware, and/or software controlling a general purpose processor. For example, in some implementations, each of world state generator 204, scenario controller(s) 206, and the optimization planner 208 includes program files stored on a storage device, loaded into a memory and executed by one or more processors. In other implementations, each of world state generator 204, scenario controller(s) 206, and the optimization planner 208 includes one or more sets of computer-executable instructions that are stored in a tangible computer-readable storage medium such as RAM hard disk or optical or magnetic media.

Example Methods

Figure 5:
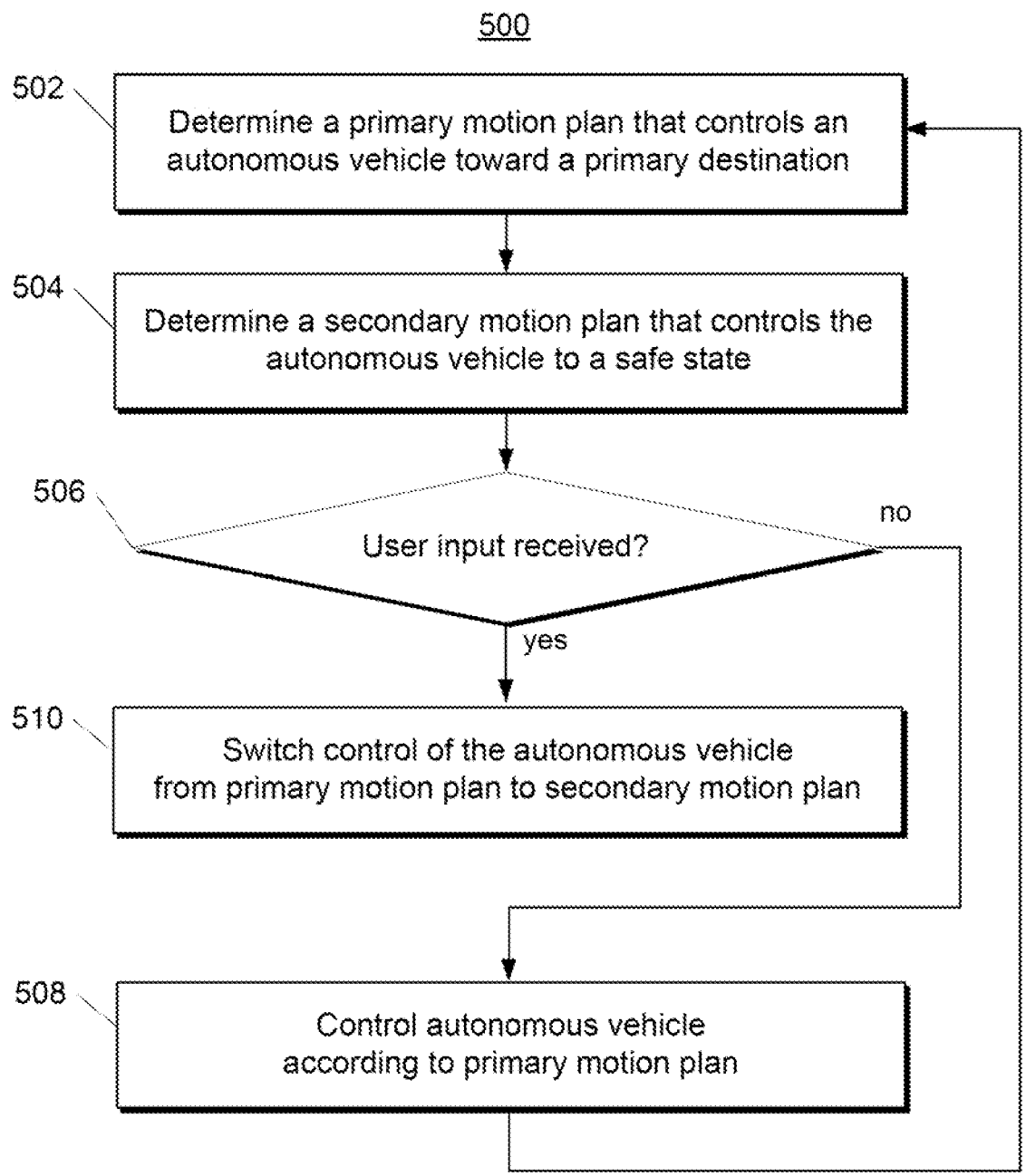
FIG. 5 depicts a flow chart diagram of an example method to control an autonomous vehicle according to example embodiments of the present disclosure.

FIG. 5 depicts a flow chart diagram of an example method 500 to control an autonomous vehicle according to example embodiments of the present disclosure.

At 502, a computing system determines a primary motion plan that controls in autonomous vehicle toward a primary destination.

At 504, the computing system determines a secondary motion plan that controls the autonomous vehicle to a safe state. In some implementations, the secondary motion plan can be an emergency motion plan. As one example, the secondary motion plan can bring the autonomous vehicle to rest while remaining within a current lane. As another example, the secondary motion plan can cause the autonomous vehicle to exit a flow of traffic.

At 506, the computing system determines whether user input has been received. In some implementations, the user input can be indicative of an undesirable situation. For example, user input can be indicative of an emergency event. If it is determined at 506 that user input has not been received, then method 500 proceeds to 508.

At 508, the computing system controls the autonomous vehicle according to the primary motion plan. After controlling the autonomous vehicle according to the primary motion plan at 508, method 500 returns to 502 and begins again. In such fashion, both a primary motion control plan and a secondary motion control plan can be iteratively determined over a number of time periods while the vehicle is operated. However if user input is not received, the computing system can control the autonomous vehicle according to the primary motion plan.

However, referring again to 506, if it is determined at 506 that user input has been received, then method 500 can proceed to 510.

At 510, the computing system can switch control of the autonomous vehicle from the primary motion plan to the secondary motion plan. Switching to the secondary motion plan can result in automatically controlling the autonomous vehicle to the safe state.

Thus, within an automated system that always has two (or more) potential courses of action prepared, human supervisor input can direct the vehicle to switch from its primary course of action to a secondary course of action. In particular, the secondary course of action can be calculated to maximize safety or otherwise reduce risk.

After the computing system controls the autonomous vehicle according to the secondary motion plan, the computing system can perform a number of additional operations or actions. As one example, after completion of the secondary motion plan, the autonomous vehicle can return or default to a manual control mode in which the human is able to control motion of the vehicle. In some implementations, the autonomous vehicle changes to the manual control mode only after a time-out period (e.g., thirty seconds) has lapsed.

As another example, after completion of the secondary motion plan, the computing system can transmit an alert to a centralized fleet manager computing system. The alert can indicate that an incident occurred, which can prompt a fleet manager to further investigate or take other action(s).

Although FIG. 5 depicts steps performed in a particular order for purposes of illustration and discussion, the methods of the present disclosure are not limited to the particularly illustrated order or arrangement. The various steps of method 500 can be omitted, rearranged, combined, and/or adapted in various ways without deviating from the scope of the present disclosure.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system, comprising:
one or more processors; and
one or more non-transitory computer-readable media that collectively store instructions that, when executed by the one or more processors, cause the computing system to perform operations, the operations comprising:
receiving data representing a first motion plan for an autonomous vehicle and a second motion plan for the autonomous vehicle,
wherein the first motion plan is determined based at least in part on sensor data, and wherein the second motion plan is determined based at least in part on the sensor data and is separately determinable from the first motion plan;

prior to receiving an input from a passenger of the autonomous vehicle, issuing one or more first control signals to control the autonomous vehicle according to the first motion plan;

determining that the input is received from the passenger of the autonomous vehicle; and in response to determining that the input is received, issuing one or more second control signals to abort the first motion plan and to control the autonomous vehicle according to the second motion plan.

2. The computing system of claim 1, wherein the first motion plan controls the autonomous vehicle towards a first destination and the second motion plan controls the autonomous vehicle towards a second destination that is different than the first destination.

3. The computing system of claim 1, wherein:
the second motion plan comprises an emergency motion plan; and
the input from the passenger of the autonomous vehicle comprises an input indicative of an emergency event.

4. The computing system of claim 1, wherein:
the first motion plan is one of a plurality of first motion plans respectively for a plurality of time periods;
the second motion plan is one of a plurality of second motion plans respectively for the plurality of time periods;
issuing one or more first control signals comprises issuing the one or more first control signals to control the autonomous vehicle according to the first motion plans for each time period prior to receipt of the input from the passenger of the autonomous vehicle; and
issuing one or more second control signals comprises issuing the one or more second control signals to control the autonomous vehicle according to the second motion plans for each time period subsequent to receipt of the input from the passenger of the autonomous vehicle.

5. The computing system of claim 4, wherein the plurality of second motion plans respectively control the autonomous vehicle to a plurality of different locations.

6. The computing system of claim 5, wherein the input from the passenger corresponds to one of the plurality of different locations, and wherein the one or more second controls signals are issued to control the autonomous vehicle according to the second motion plan that corresponds to the input.

7. The computing system of claim 1, wherein control of the autonomous vehicle according to the second motion plan brings the autonomous vehicle to rest while remaining within a current lane.

8. The computing system of claim 1, wherein control of the autonomous vehicle according to the second motion plan causes the autonomous vehicle to exit a current lane.

9. The computing system of claim 1, wherein the first motion plan is determined based at least in part on a first set of cost functions, and the second motion plan is determined based at least in part on a second set of cost functions.

10. The computing system of claim 1, wherein the second motion plan controls the autonomous vehicle to a safe state.

11. The computing system of claim 10, wherein the first motion plan comprises a first trajectory that moves the autonomous vehicle towards a first destination, and the second motion plan comprises a second trajectory that moves the autonomous vehicle to the safe state.

12. An autonomous vehicle, the autonomous vehicle comprising:
one or more processors; and
one or more non-transitory computer-readable media that collectively store instructions that, when executed by the one or more processors, cause the one or more processors to perform operations, the operations comprising:

receiving data representing a first motion plan for the autonomous vehicle and a second motion plan for the autonomous vehicle, wherein the first motion plan is determined based at least in part on sensor data, and wherein the second motion plan is determined based at least in part on the sensor data and is separately determinable from the first motion plan;

prior to receiving an input from a passenger of the autonomous vehicle, issuing one or more first control signals to control the autonomous vehicle according to the first motion plan;

determining that the input is received from the passenger of the autonomous vehicle; and in response to determining that the input is received, issuing one or more second control signals to abort the first motion plan and to control the autonomous vehicle according to the second motion plan.

13. The autonomous vehicle of claim 12, wherein the first motion plan is determined via a first motion planning module and the second motion plan is determined via a second motion planning module.

14. The autonomous vehicle of claim 12, wherein the second motion plan controls the autonomous vehicle to a safe state.

15. The autonomous vehicle of claim 12, wherein:
the second motion plan comprises an emergency motion plan; and
the input from the passenger of the autonomous vehicle comprises an input indicative of an emergency event.

16. The autonomous vehicle of claim 12, wherein the second motion plan is one of a plurality of second motion plans, wherein the plurality of second motion plans respectively control the autonomous vehicle to a plurality of different locations, and wherein the input from the passenger corresponds to one of the plurality of different locations.

17. The autonomous vehicle of claim 12, wherein control of the autonomous vehicle according to the second motion plan brings the autonomous vehicle to rest while remaining within a current lane.

18. The autonomous vehicle of claim 12, wherein control of the autonomous vehicle according to the second motion plan causes the autonomous vehicle to exit a flow of traffic.

19. The autonomous vehicle of claim 12, wherein the first motion plan controls the autonomous vehicle towards a first destination and the second motion plan controls the autonomous vehicle towards a second destination that is different than the first destination.

20. A computer implemented method implemented comprising:
receiving, by a computing system comprising one or more computing devices, data representing the first motion plan for an autonomous vehicle and the second motion plan for the autonomous vehicle,
wherein the first motion plan is determined based at least in part on sensor data, and wherein the second motion plan is determined based at least in part on the sensor data and is separately determinable from the first motion plan;

prior to receiving an input from a user of the autonomous vehicle, issuing one or more first control signals to control the autonomous vehicle according to the first motion plan;

determining that the input is received from the user of the autonomous vehicle; and in response to determining that the input is received, issuing one or more second control signals to abort the first motion plan and to control the autonomous vehicle according to the second motion plan.

* * * * *